US011792470B2

United States Patent
Elcock et al.

(10) Patent No.: US 11,792,470 B2
(45) Date of Patent: Oct. 17, 2023

(54) TRANSFER OF MEDIA CONTENT VIEWING EXPERIENCE USING EPG GUIDE

(71) Applicant: ARRIS Enterprises LLC, Suwanee, GA (US)

(72) Inventors: Albert F. Elcock, West Chester, PA (US); Charles Hardt, Lawrenceville, GA (US); Christopher S. DelSordo, Souderton, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/162,050

(22) Filed: Jan. 29, 2021

(65) Prior Publication Data

US 2021/0250643 A1    Aug. 12, 2021

Related U.S. Application Data

(60) Provisional application No. 62/971,272, filed on Feb. 7, 2020.

(51) Int. Cl.
*H04N 21/436* (2011.01)
*H04N 21/443* (2011.01)
(Continued)

(52) U.S. Cl.
CPC . *H04N 21/43615* (2013.01); *H04N 21/42203* (2013.01); *H04N 21/4333* (2013.01); *H04N 21/4436* (2013.01)

(58) Field of Classification Search
CPC ....... H04N 21/43615; H04N 21/42203; H04N 21/4333; H04N 21/4436; H04N 21/4432;
(Continued)

(56) References Cited

U.S. PATENT DOCUMENTS 10,034,043 B2    7/2018  Gordon et al.
2004/0104806 A1*  6/2004  Yui .................. G08C 17/02
                                          340/5.74

(Continued)

FOREIGN PATENT DOCUMENTS

JP   2004-102415 A     4/2004
JP   2007-104193 A     4/2007
KR   10-2014-0055981 A  5/2014

OTHER PUBLICATIONS

Notification of Transmittal of the International Search Report (Forms PCT/ISA/220 and PCT/ISA/210) and the Written Opinion of the International Searching Authority (Form PCT/ISA/237) dated May 24, 2021, by the International Application Division Korean Intellectual Property Office in corresponding International Application No. PCT/US2021/015763. (10 pages).

(Continued)

*Primary Examiner* — James R Marandi
(74) *Attorney, Agent, or Firm* — Panitch Schwarze Belisario & Nadel LLC

(57) ABSTRACT

Disclosed are a network and method for transferring media content experience from a first smart media device to a second smart media device via an electronic program guide. Each of the smart media devices are pre-configured to have a unique name which is viewable from the electronic program guide, and to establish two way communications between the uniquely named first and second smart media devices. The electronic program guide is run on at least one of the smart media devices, and the electronic program guide is viewed on a display associated with at least one of the smart media devices. A user is provided a plurality of options to interact with the electronic program guide, including the option to transfer and view the media content experience selected on the first media device to the second
(Continued)

smart media device. Preferably, the user selects options via voice commands or manually inputted commands.

20 Claims, 6 Drawing Sheets

(51) Int. Cl.
  *H04N 21/433* (2011.01)
  *H04N 21/422* (2011.01)
(58) Field of Classification Search
  CPC .......... H04N 21/43078; H04N 21/482; H04N 21/485
  See application file for complete search history.

(56) References Cited

U.S. PATENT DOCUMENTS

| | | | | |
|---|---|---|---|---|
| 2005/0096753 | A1* | 5/2005 | Arling | H04L 12/2805 |
| | | | | 700/11 |
| 2008/0005690 | A1* | 1/2008 | Van Vugt | G06F 3/0482 |
| | | | | 715/765 |
| 2010/0014834 | A1* | 1/2010 | Flynn | H04N 21/47214 |
| | | | | 386/230 |
| 2016/0006864 | A1 | 1/2016 | Park et al. | |
| 2016/0007095 | A1* | 1/2016 | Lacroix | H04N 21/234 |
| | | | | 348/552 |
| 2016/0261904 | A1 | 9/2016 | Qian et al. | |
| 2017/0147129 | A1 | 5/2017 | Kyoun et al. | |
| 2017/0329572 | A1* | 11/2017 | Shah | H04N 21/4722 |
| 2020/0280756 | A1* | 9/2020 | Vurimi | H04N 21/4532 |
| 2021/0092176 | A1* | 3/2021 | Schneider | H04N 21/8455 |
| 2021/0204031 | A1* | 7/2021 | VanSickel | G06F 3/0482 |

OTHER PUBLICATIONS

Int'l Preliminary Report on Patentability dated Aug. 18, 2022 in Int'l Application No. PCT/US2021/015763.

* cited by examiner

TRANSFER OF MEDIA CONTENT VIEWING EXPERIENCE USING EPG GUIDE

FIELD OF THE INVENTION

The present invention relates generally to a method and apparatus for viewing media on a Smart Media Device ("SMD"), and more particularly to viewing the same media on different SMD's, usually located in different locations within in a Wireless Local Area ("WLAN"), using an Electronic Program Guide ("EPG").

BACKGROUND OF THE INVENTION

Cable service providers, which are also referred to as Multiple System Operators ("MSO"), use community access television ("CATV") network infrastructure for carrying television content signals and video on demand ("VoD") signals, among other types. Typically, multiple set-top boxes are installed in a customer's premises to allow content to be viewed in multiple rooms within the premises. Digital video recorders ("DVRs") and personal video recorders ("PVRs") have allowed users to record programs for later viewing, thereby time-shifting their television viewing. As a general rule, the amount of content available for viewing or recording is limited by the number of tuners in a set-top box installed at the customer's premises. This is not true, however, when playing back DVR content from HDD or for IP based services. It is desirable to provide users with the ability to move from room to room within a premises and seamlessly access content throughout the premises, instead of limiting the viewing of media to the location at which it was originally downloaded or recorded. It is also desirable to transfer or control the media viewing experience to another location prior to moving to a new location so that the viewing experience is ready to go.

In a known system of the type described in U.S. Pat. No. 10,034,043, entitled "Recorded Multimedia and Live Television Roaming," the ability to view media in different locations within the customer's premises is provided by a multiple set-top box system. In this type of system, there is a master set-top box with one or more dependent set-top boxes. This system can pause the playback of recorded multimedia or live television on the master set-top box and create a pause point. The user can then resume playback from the pause point on the master set-top box or resume playback on a dependent set-top box at the same resume point. While the ability to resume playback on the master or dependent set-top back at the same pause point is an attractive feature, compared to the presently disclosed way, it is relatively cumbersome process involving multiple manual steps which may deter users from using this feature. This known approach also does work for the situation where you want to continue watching a program in the previous room. Accordingly, there is a need for a more automated system that can conveniently provide a user with the ability to view the same media experience in different locations using different SMD's without having to implement cumbersome manual steps each time this feature is used.

SUMMARY OF THE INVENTION

The present invention expands the functionality of EPG (Electronic Program Guide) guides, and allows the consumer or users of SMDs (e.g., smart TVs, wall displays and monitors, tablet and handheld computers, smart speakers, and other media players, etc.) to transfer the media viewing experience from the current SMD to another SMD in another location within the consumer's premises or to a mobile device, such as a smartphone. Guide interaction is either via voice control or menu interaction, preferably through some type of handheld device (e.g., smart phone or remote control, etc.). The present invention includes the ability to automatically prepare the media viewing experience on the SMD in the new location such as changing the state of the SMD to the "on" state, turning on any connected DTV via HDMI CEC communication, tuning the channel/selecting the program, setting the position of the program at the same point to where it was being watched in the previous location. Finally, the program can be set in the paused state so that the consumer can start the viewing the program on the new SMD. The present invention requires implementation on both the SMD in the current location and the SMD device in the new location, preferably through a pre-configuration of both SMD devices. It also requires communication between those SMD devices over a common network. A goal of the presently disclosed method and system is to provide convenience to the consumer and decrease the manual steps they need to transfer their viewing experience.

DETAILED DESCRIPTION OF THE PREFERRED EMBODIMENTS AND METHODS

Consumers typically have SMD's located in many rooms of their houses, such as the family room, living room, bedroom, bathroom, kitchen and basement. These SMD devices may be connected to TVs for video display or have displays of their own. The location of a mobile SMD can move around from various locations and rooms due to Wi-Fi connectivity, which also means they could be located outdoors as well. Set top boxes can also be moved when they are connected by Wi-Fi. Accordingly, a Wi-Fi connected Set top box as well as a mobile phone may be adapted to transfer the viewing experience in accordance with the method and apparatus disclosed herein.

In many cases, when the consumer or user is watching a show in one location and moves to another location, he or she may want to continue watching the same show. This will require turning on the device and performing manual steps to tune the channel or start the media from the same spot which the consumer last viewed. Many consumers do the same thing daily, but it can become cumbersome.

Another use case would be where the consumer is about to leave the house and he or she would like to continue watching the same program on his or her smart phone. Accordingly, it is desirable for the consumer, if he or she could have a feature where they could transfer the watching experience to their smart phone in an automated fashion prior to relocating.

It is an object of the present invention, therefore, to make the transfer of this watching experience between SMDs or between SMD and another device easy and automatic for the consumer. One way to implement this invention is to use the EPG and interact through the guide. This interaction can also be accomplished via voice control commands further increasing the convenience to the consumer. Conventional program guides only support tuning and displaying content on the associated, connected TV. The presently disclosed method and system expands the functionality of an EPG.

One of the novel features of the exemplary embodiments over conventional EPG's is that it makes use of the EPG program guide to initiate the transfer of the media viewing experience. The EPG program guide is at the center of the media viewing experience for viewing shows on a first SMD and then expands its functionality to transfer viewing experiences to other SMDs that reside on the consumer's premises. In order to achieve this expanded functionality, all the SMD's utilizing the present invention should be pre-configured, as illustrated in FIG. 6, to perform automated steps on a properly configured SMD device.

Figure 1:
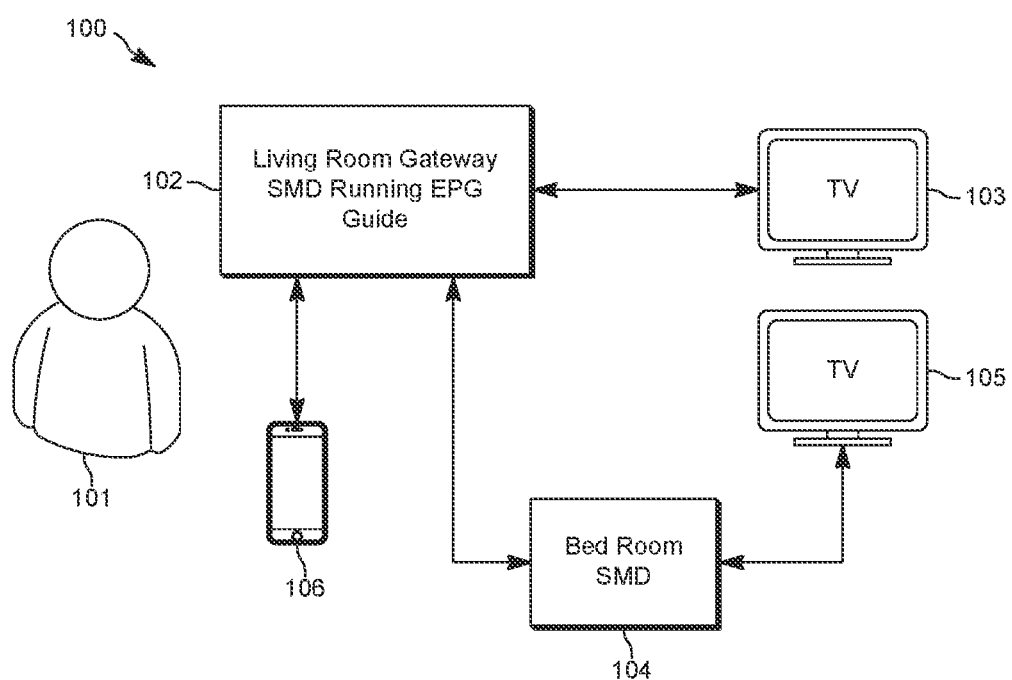
FIG. 1 is a diagram that illustrates the network devices associated with the present invention.

Referring now to FIG. 1, a diagram illustrates the preferred embodiment of the exemplary embodiments. A consumer 101 interacts with an EPG which is running on a SMD 102 via voice commands, or the consumer interacts via a handheld input device (not shown). In response to the commands of the consumer, the TV 103 displays an on-screen display of the EPG. The SMD 102 may be a gateway SMD which is conveniently located in a living room or other convenient location. In the initial set up process, the consumer 101 pre-configures other devices such as a smart phone 106 and other SMDs, including for example, a bedroom SMD 104, which may be connected to a TV 105. The smart phone 106 and SMDs 102, 104 include software responsive to the pre-configuration commands of the consumer 101, and this pre-configuration step allows the living room SMD 102 and smart phone 106 to communicate with the bedroom SMD 104. Of course, there can be many other SMDs of various device types and connectivity. After the pre-configuration steps are completed as described below, the media viewing experience can be automatically transferred to the smart phone 106 and the bedroom SMD 104. In the case of the bedroom SMD 104, the TV 105 can automatically be turned on by the bedroom SMD 104, and the media viewing experience is paused.

Configuration of SMD Device Identification

Figure 6:
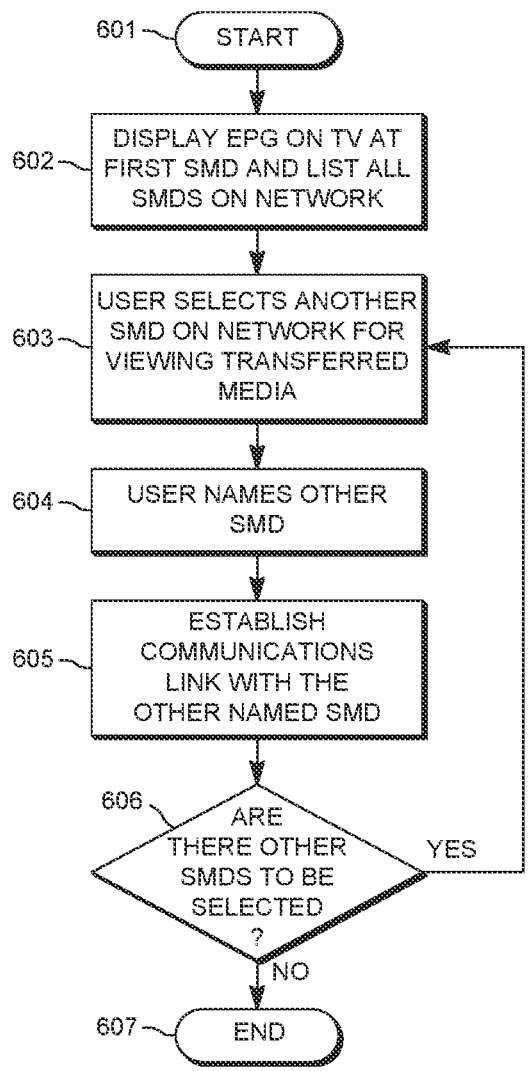
FIG. 6 is a flow diagram of the steps associated with an EPG pre-configuration process associated with the present invention.

Referring now to FIG. 6, a flow diagram illustrates the steps associated with the EPG pre-configuration process. The pre-configuration process begins with a starting step 601, which results in the EPG running on a first SMD and being displayed on a TV or other viewing device, or remote control (which might be a smart phone), in step 602. In step 603, the user selects (either orally or through physical contact or gesture) another SMD located on the network for viewing the media to be transferred. In step 604, the user names this other SMD. In step 605, a communication link is established between the SMD running the EPG and the newly named SMD. In step 606, the user repeats the process for any other SMDs located on the network, in order that media can also be transferred to these other SMDs.

During the pre-configuration process, the consumer or user will need to pre-configure all the devices where he or she wants to transfer media viewing experiences, in order to insure the proper device identification mechanism is set up. This process also includes the pre-configuration necessary for communication channels to be established over the network. These pre-configured device names are used during voice commands used to transfer or extend the media viewing experience to these devices. For example in FIG. 1, the user can assign unique device names, such as "Living Room Device," "Bedroom Device," and "Smart Phone." The voice commands also preferably include options that a user may select. For example, the user selected options could include such commands as "Select Program," "Pause Program," "Play Program," "Select Bed Room Device," "Select Basement Device," etc.

EPG Guide Interaction

The present exemplary embodiments also preferably include support for alternate ways to interact with the EPG guide to transfer Media viewing experience to another device. The alternate ways to interact with the EPG guide will now be described.

Transfer Viewing of the Current Program

Figure 2:
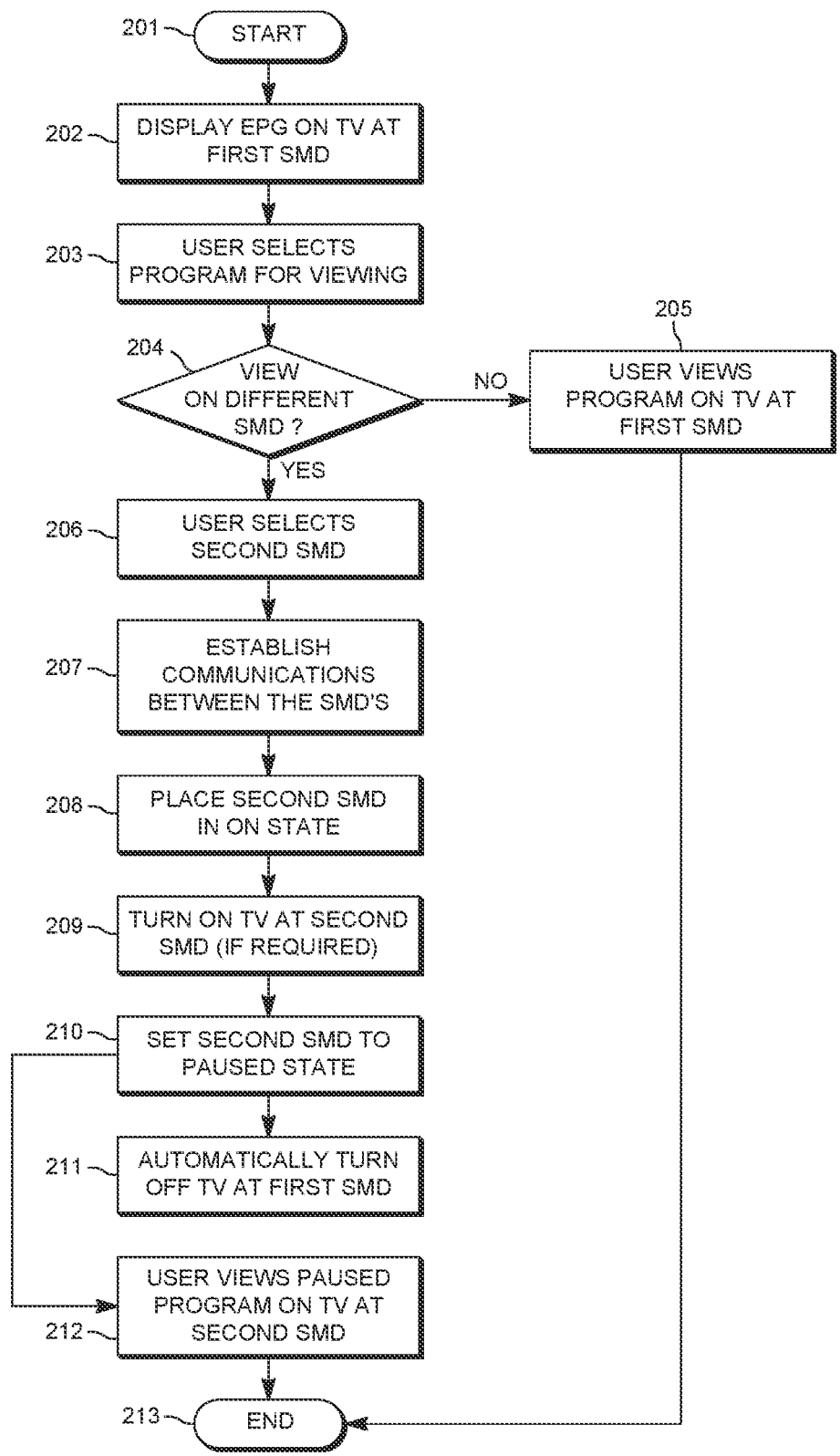
FIG. 2 is a flow diagram of a first way that a user interacts with an EPG to view media in more than one location.

Referring now to FIG. 1 and FIG. 2, the flow diagram of FIG. 2 is provided to illustrate a first way that a user interacts with the EPG to view the same media in more than one location in network 100. This first way to interact with the EPG guide is when there is a transfer viewing of a current program. The transfer process begins a starting step 201 and a display of the EPG on TV 103 in step 202. Preferably, when the user selects a program using the EPG on-screen guide displayed on TV 103 in step 203; the user is then offered the option to play the program on a different SMD in step 204, such as Bedroom SMD 104 within the network or to play it on the current device, SMD 102. In step 203, the SMD device names that are displayed are the ones that were pre-configured for this feature. If the user wishes to view the program on the current TV 103, then in step 205 the selected program is viewed on the current TV 103. If the user selects a different SMD in step 206, such as Bedroom SMD 104, within the network 100, the EPG initiates communication between the SMDs 102 and 104 in step 207 such that the "other" SMD 104 can play the program. For example, the other Bedroom SMD 104 is preferably configured by the EPG in step 208 to be in the on-state. In step 209, its digital TV 105 device (if required) is turned on, the appropriate channel and/or program selection occurs, and then Bedroom SMD 104 is set in the paused state in step 210 until the user is ready to start watching it on TV 105 in step 212. As one of the final steps, this first way may preferably include step 211 for automatically turning off the current digital TV, such as TV 102 from which the user selected the program.

Transfer Viewing of Currently Paused Program

Figure 3:
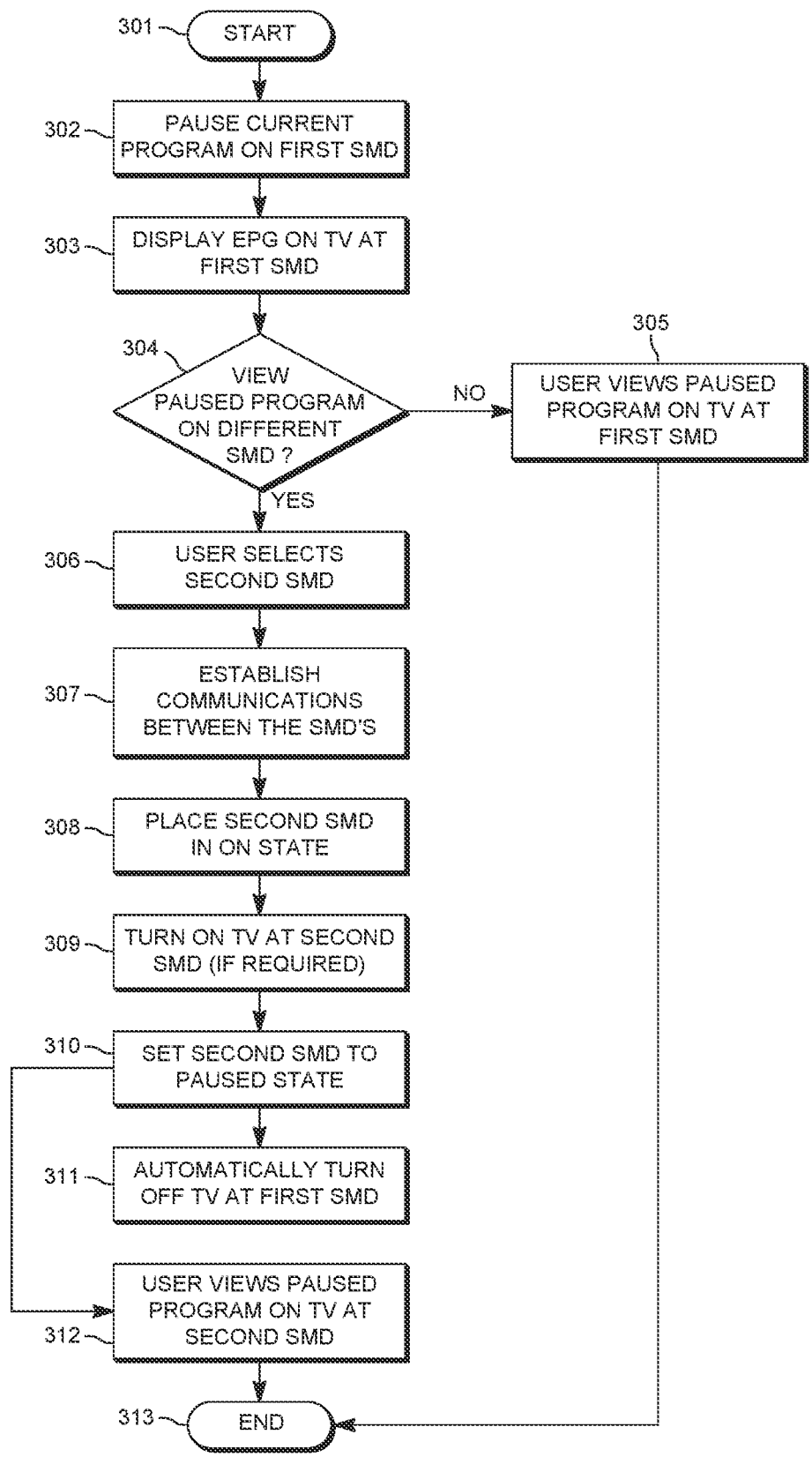
FIG. 3 is a flow diagram of a second way that a user interacts with an EPG to view media in more than one location.

Referring now to FIG. 1 and FIG. 3, the flow diagram of FIG. 3 is provided to illustrate a second way that a user interacts with the EPG to view the same media in more than one location in network 100. The second way to interact with the program guide begins with a starting step 301, and when in step 302, the user pauses the currently viewed program on a SMD, such as Living Room SMD 102. In step 304, the user is then offered the option to resume on another SMD on the network or resume it on the current device SMD 102. If in step 306, the user selects a different SMD on the network, such as SMD 104, this will in step 307 initiate communication between the SMDs 102 and 104 such that the "other" SMD 104 will display the same program in the paused state. In step 308, the SMD 104 is configured to the on-state, and in step 309, its digital TV device 105 (if required) is turned on. In step 310 the appropriate channel and/or program selection occurs, the program/video position is then set, and then set to the paused state until in step 312 the consumer is ready to start watching it. As one of the final steps, this second way may preferably include step 311 for automatically turning off the current digital TV, such as TV 103 from which the user selected the program.

Control Viewing of Any Program on Another SMD

Figure 4:
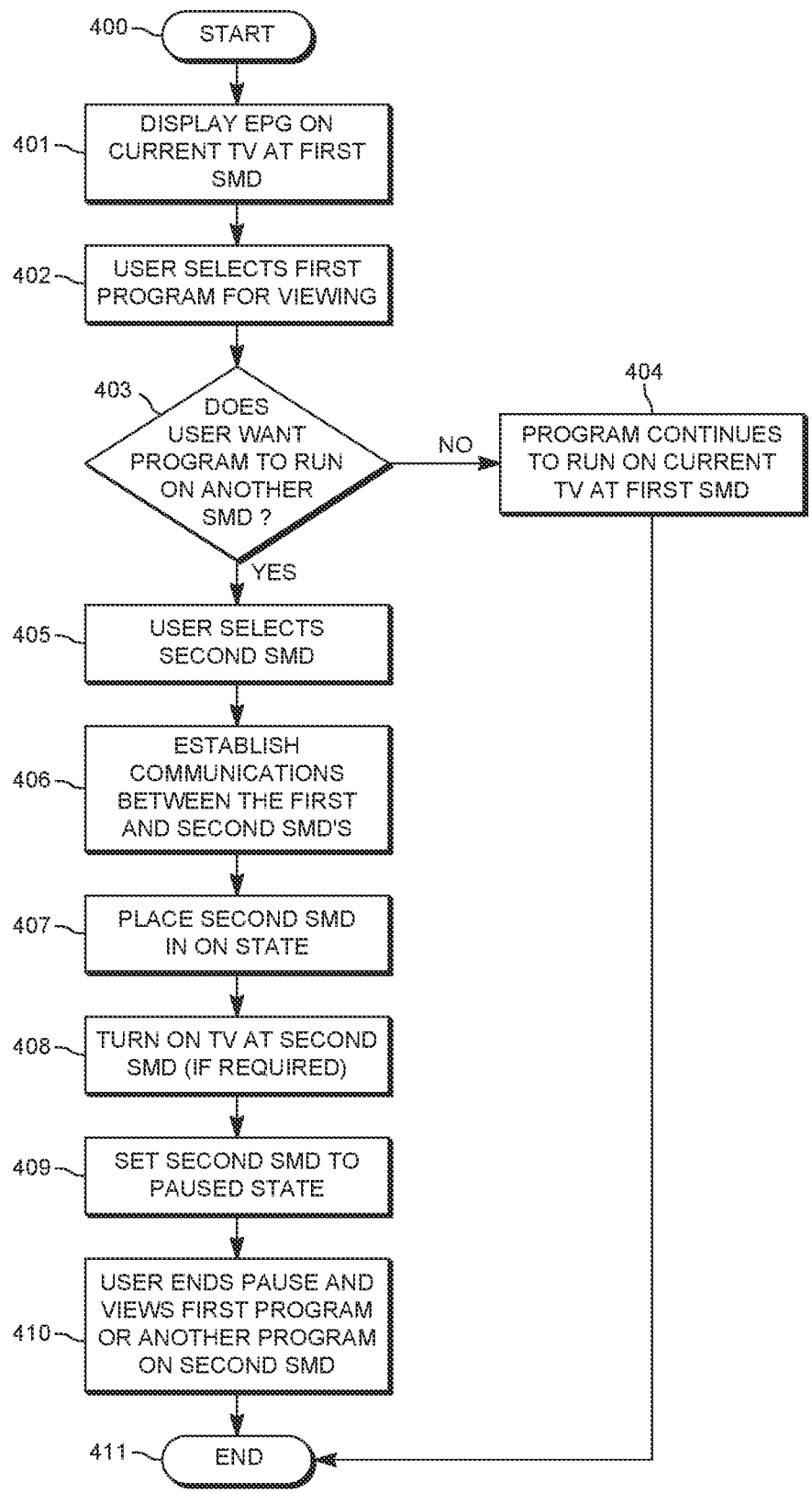
FIG. 4 is a flow diagram of a third way that a user interacts with an EPG to view media in more than one location.

Referring now to FIG. 1 and FIG. 4, the flow diagram of FIG. 4 is provided to illustrate a third way that a user interacts with the EPG to view the same media in more than one location in network 100. The third way to interact with the program guide begins with a starting step 400, and in step 401, the EPG running on SMD 102 is displayed on TV 103. In step 402, the user or consumer selects a program using the EPG on-screen guide or via a voice command. In step 403 the user is then offered the option to play the program on a different SMD, such as Bedroom SMD 104, on the network or to play it on the current device, such as Living Room SMD 102. The unique SMD device names that were pre-configured by the consumer are displayed in the EPG and can be selected in step 403. If the consumer selects a different SMD, such as SMD 104, this will initiate in step 406 communication between the SMDs 102 and 104, such that the second or "other" SMD 104 can play the program.

Preferably, the other SMD 106 will be configured to the on-state in step 407, its digital TV device 104 (if required) is turned on in step 408, the appropriate channel and/or program selection also occurs, and the appropriate program position is set. In step 409, the program is set in the paused state until the consumer is ready to start watching it or another program in step 410. In this way of interacting with EPG, the first or current TV 103 continues to play the same program on the current SMD 102 independent of what program was finally selected for the "other" SMD 104.

In each of the three ways described above for interacting with the EPG, the present exemplary embodiment will also allow the consumer to use voice control commands that will result in interaction with the EPG control. This would include automatic query of where the consumer wants to transfer and view the media experience.

Computer System Architecture

Figure 5:
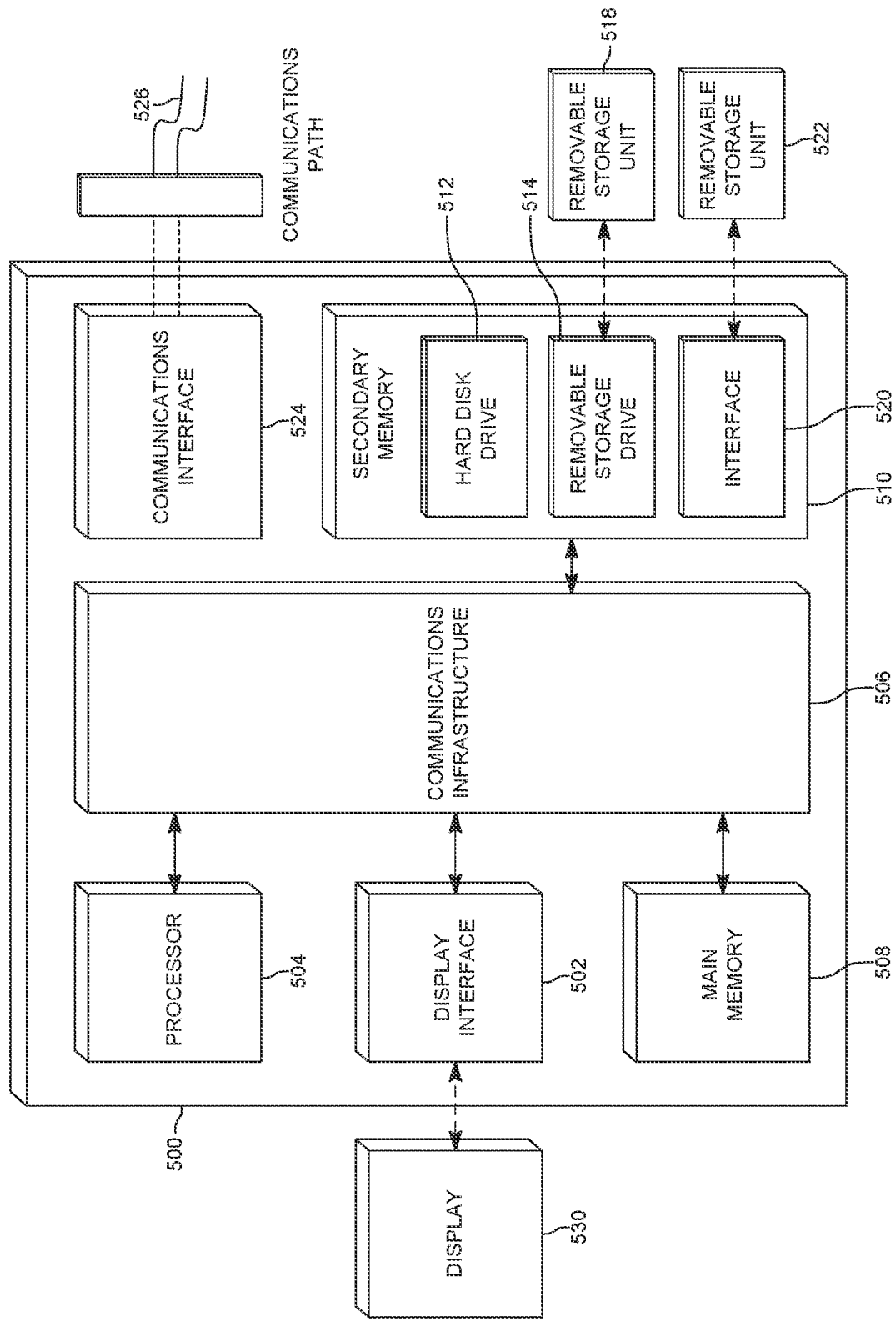
FIG. 5 illustrates a representative computer system.

FIG. 5 illustrates a representative computer system 500 in which embodiments of the present disclosure, or portions thereof, may be implemented as computer-readable code. For example, the Wi-Fi router/gateway 102, cell phone 106, DTV 103, set top box 104, and TV 105 of FIG. 1 may be implemented in whole or in part by a computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present invention.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 2-4 and 6, as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for the transfer of media content viewing experience when using an EPG. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for transferring a current media content experience from a first smart media device to a second smart media device that is in an off state via interaction with an electronic program guide, comprising:
  pre-configuring, using the first smart media device on a network, the electronic program guide to:
    display one or more preconfigured second smart media devices within the network for selection, the one or more preconfigured second smart media devices being separate from the first smart media device;
    initiate communication between the first smart media device and a selected second smart media device of the one or more preconfigured second smart media devices;
    perform said transferring of the current media content experience from the first smart media device to the selected second smart media device;
    turn on the selected second smart media device;
    display the transferred media content experience in a paused state on a display of the selected second smart media device such that the transferred media content experience remains in the paused state until the selected second smart media device receives user instructions; and
    turn off the first smart media device once the current media content experience is transferred; and
  providing a user a plurality of options to interact with the electronic program guide of the first smart media device, including the option to automatically transfer and view media content selected on the first smart media device to the selected second smart media device.

2. A method according to claim 1, wherein the user selects options via voice commands.

3. A method according to claim 1, wherein the user selects options via manually inputted commands.

4. A method according to claim 1, wherein the electronic programming guide running on the first smart media device provides an option to transfer the current media content experience being rendered on the first smart media device or another media content experience.

5. A method according to claim 1, wherein the options are provided to the user when the user opens the electronic program guide to select media content for viewing.

6. A method according to claim 5, wherein the current media content experience continues to play on the first smart media device after the user has selected the options to transfer and view the current media content experience to the selected second smart media device.

7. A method according to claim 6, wherein a pause point of the current media content experience on the first smart media device is communicated to the selected second smart media device.

8. A method according to claim 5, wherein the display at the first smart media device is automatically turned off.

9. A method according to claim 5, wherein the user is provided with the option of watching the media content on the first smart media device and still setting up a media viewing experience on a second smart media device of the one or more preconfigured second smart media devices.

10. A method according to claim 1, wherein the electronic program guide is displayed when the user initiates a pause command and is provided an option to select the second smart media device of the one or more preconfigured second smart media devices and transfer the paused media content experience to the selected second smart media device.

11. A method according to claim 10, wherein a media content experience is transferred from the first smart media device to the selected second smart media device in an off state which results in the selected second smart media device going to an on state and presenting the transferred media content experience.

12. A method according to claim 10, wherein the display on the selected second smart media device is turned on and the display on the first smart media device is turned off after the transfer of the media content experience.

13. A method according to claim 1, wherein during the playing of the current media content experience, the user pulls up the electronic program guide and selects a program and is given the option to transfer the current media content experience to the second smart media device of the one or more preconfigured second smart media devices.

14. A first smart media device for use on a network, comprising:
an input for receiving media content;
a processor for:
pre-configuring an electronic program guide to:
display one or more preconfigured second smart media devices for selection, the one or more preconfigured second smart media devices being separate from the first smart media device;
initiate communication between the first smart media device and a selected second smart media device of the one or more preconfigured second smart media devices;
transfer a current media content experience to at least the selected second smart media device of the one or more preconfigured second smart media devices and an associated display of the selected second smart media device, which are located on the network;
turn on the selected second smart media device in preparation of setting up a transferred media content experience; and
turn off the first smart media device once the current media content experience is transferred; and
an output for transmitting data relating to the media content and the electronic program guide to a display associated with the first smart media device, and to the selected second smart media device, and
wherein the user selects the media content from the electronic program guide of the first smart media device and the identity of the selected second smart media device, which is uniquely named and on which the media content is to be played, and in response to the selected options of the user, the processor communicates the selected options to the selected second smart media device to enable the selected second smart media device to automatically display the transferred media content experience in a paused state on a display of the selected second smart media device such that the transferred media content experience remains in the paused state until the selected second smart media device receives user instructions.

15. A smart media device according to claim 14, wherein the user commands are inputted to the smart media device via voice commands.

16. A smart media device according to claim 14, wherein the user commands are inputted to the smart media device via a manual input device.

17. A smart media device according to claim 14, wherein the electronic programming guide running on the first smart media device provides an option to transfer the current media content experience being rendered on the first smart media device or another media content experience.

18. A smart media device according to claim 14, wherein the selected second smart media device is a smart phone.

19. A smart media device according to claim 14, wherein the smart media devices are coupled to digital televisions to view the media content.

20. A smart media device according to claim 14, wherein a pause point of the current media content experience on the first smart media device is communicated to the selected second smart media device.

* * * * *